(No Model.)
J. A. ALLEN.
DEVICE FOR PREVENTING THE BACKWARD MOVEMENT OF MACHINERY.
No. 400,284. Patented Mar. 26, 1889.
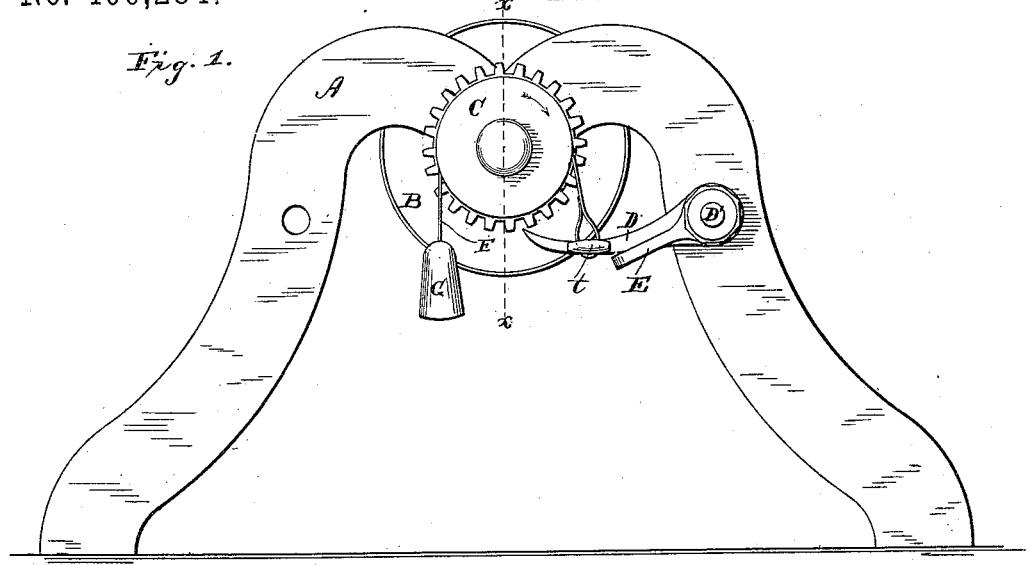
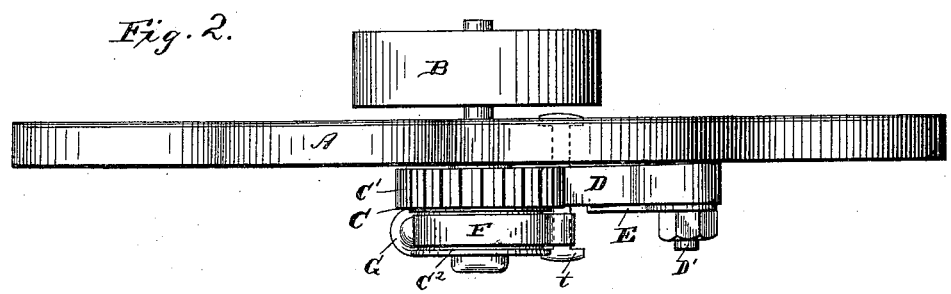
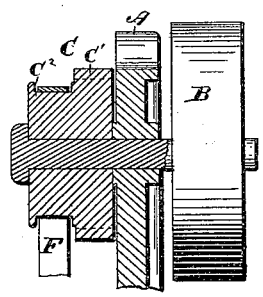
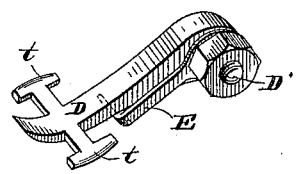
Witnesses.
Chas. R. Burr.
A. J. Stewart.
Inventor.
James A. Allen
By Church & Church
his Attorneys.

UNITED STATES PATENT OFFICE.

JAMES A. ALLEN, OF ADAMS, MASSACHUSETTS.

DEVICE FOR PREVENTING THE BACKWARD MOVEMENT OF MACHINERY.

SPECIFICATION forming part of Letters Patent No. 400,284, dated March 26, 1889.

Application filed October 4, 1887. Renewed July 26, 1888. Serial No. 281,123. (No model.)

*To all whom it may concern:*

Be it known that I, JAMES A. ALLEN, of Adams, in the county of Berkshire, State of Massachusetts, have invented certain new and useful Improvements in Devices for Preventing the Backward Movement of Machinery; and I do hereby declare the following to be a full, clear, and exact description of the same, reference being had to the accompanying drawings, forming a part of this specification, and to the figures and letters of reference marked thereon.

My present invention relates to an improved construction and arrangement of devices for preventing the reverse or back motion of machinery when the driving mechanism is detached or uncoupled to stop the machine, and it is more especially adapted for use in connection with winding mechanism—such as warp-beaming machinery—wherein when the belt is shifted from the fast to the loose pulley the threads, being under a certain degree of tension, tend to move the drum and the devices connected therewith backward or in a direction to relax the strain and permit the displacement of the threads; and it consists in a certain automatic device that will, as soon as the backward movement begins, throw a pawl into engagement to prevent the further rotation in that direction, but as the machine is started forward will be moved out of the way and permit such rotation, all of which I will now proceed to describe.

Referring to the accompanying drawings, Figure 1 represents a view of my invention, showing its application to the frame-work of any suitable machine. Fig. 2 is a top plan view. Fig. 3 is a sectional view on the line $xx$ of Fig. 1; and Fig. 4 is a perspective view of the pawl and stop.

Similar letters of reference in the several figures indicate the same parts.

A represents the frame-work of any suitable machine to which my invention is to be applied, and B the pulley for receiving the belt to drive the same. On the same shaft as the pulley B is mounted a pulley or drum, C, consisting of two parts, the one, C', having a series of teeth upon its periphery, and the other, $C^2$, smooth, as shown.

D represents a pawl pivoted upon a bolt, D', on the machine-frame and provided near its outer end with two T-shaped projections, $tt$, one on either side. The end of this pawl is adapted to engage with the ratchet-teeth on the pulley C', and its motion away from the latter is limited by the adjustable arm E, secured to the pivot-bolt and projected beneath said pawl.

F is a strap, preferably of leather, one end of which is secured to one of the projections $t$ on the pawl, and after passing over the smooth portion $C^2$ of the pulley B the other is attached to a weight, G, sufficiently heavy to counterbalance the pawl, so that when the machine starts and the pulley is rotated in the direction of the arrow in Fig. 1 the friction on the strap will cause the weight to be raised and the pawl to be disengaged from the ratchet-wheel and rest upon the stop E. This stop can be moved up or down to regulate the distance the machine shall move before the motion is checked. When the machine is stopped and starts to run backward, the weight, assisted by the friction on the belt, will raise the pawl again into engagement with the ratchet-wheel, thus preventing any further reverse movement. If for any reason it should be desirable to operate the machine in the opposite direction, the pawl and stop can be placed on the opposite side of the ratchet-wheel and the strap applied to the opposite projection $t$ on the pawl, as will be readily understood.

This device does away with the noisy spring-ratchets sometimes employed for preventing the backward rotation of machinery, and is better than the eccentric clamp employed, as, in order to operate the latter, it is necessary to run the machine some distance back in order to have it catch.

I claim as my invention—

1. The combination, with the pulley having the ratchet-teeth, of the pawl, the belt or strap, and the weight, substantially as described.

2. The combination, with the pulley having the ratchet-teeth, of the pawl, the belt or strap, the weight, and the stop E, substantially as described.

3. The combination, with the pulley and ratchet, of the strap held in frictional contact with the pulley, the pawl attached to one end of the strap and the counterbalancing-weight to the other, and the stop for limiting the movement of the pawl, substantially as described.

JAMES A. ALLEN.

Witnesses:
JEROME N. BRIGGS,
WILLIAM H. BATES.